United States Patent
Takeda et al.

(10) Patent No.: US 9,592,875 B2
(45) Date of Patent: Mar. 14, 2017

(54) INVERTED VEHICLE

(71) Applicants: Takahiro Takeda, Toyota (JP); Kouta Oishi, Nagakute (JP); Kazutomo Misao, Toyota (JP)

(72) Inventors: Takahiro Takeda, Toyota (JP); Kouta Oishi, Nagakute (JP); Kazutomo Misao, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/438,403

(22) PCT Filed: Sep. 30, 2013

(86) PCT No.: PCT/JP2013/005824
§ 371 (c)(1),
(2) Date: Apr. 24, 2015

(87) PCT Pub. No.: WO2014/064887
PCT Pub. Date: May 1, 2014

(65) Prior Publication Data
US 2015/0298756 A1    Oct. 22, 2015

(30) Foreign Application Priority Data
Oct. 26, 2012    (JP) ................. 2012-236326

(51) Int. Cl.
*B62K 3/00*    (2006.01)
*B62K 23/08*    (2006.01)

(52) U.S. Cl.
CPC .............. *B62K 3/007* (2013.01); *B62K 23/08* (2013.01)

(58) Field of Classification Search
CPC .......... B62K 3/00; B62K 3/007; B62K 17/00; B62K 23/08; B62J 25/00
(Continued)

(56) References Cited

U.S. PATENT DOCUMENTS

| 5,319,996 A | 6/1994 | Harris |
| 2004/0007399 A1* | 1/2004 | Heinzmann ............ A63C 17/12 180/7.1 |

(Continued)

FOREIGN PATENT DOCUMENTS

| GB | 139924 A * | 3/1920 | ............. B62J 25/00 |
| JP | 2001-063510 A | 3/2001 | |

(Continued)

*Primary Examiner* — Tony Winner
*Assistant Examiner* — Felicia L Brittman
(74) *Attorney, Agent, or Firm* — Andrews Kurth Kenyon LLP

(57) ABSTRACT

An inverted vehicle according to the present invention includes: wheel; a base that holds the wheel; a step cover on which a rider rides, the step cover being connected to an upper portion of the base; an elastic element that is connected to the upper portion of the base and elastically supports the step cover; a detection portion that is provided between the base and the step cover and detects a pressing force applied from the step cover when the rider is riding on the inverted vehicle and the elastic element is elastically deformed to thereby depress the step cover; and a control portion that drives the wheel based on the detection of the pressing force by the detection portion. The step cover is connected to the base with a hinge.

7 Claims, 16 Drawing Sheets

(58) Field of Classification Search
USPC .......................................................... 180/218
See application file for complete search history.

(56) References Cited

U.S. PATENT DOCUMENTS

| | | |
|---|---|---|
| 2006/0260857 A1 | 11/2006 | Kakinuma et al. |
| 2012/0166048 A1 | 6/2012 | Inoue et al. |
| 2012/0243822 A1 | 9/2012 | Kobori et al. |

FOREIGN PATENT DOCUMENTS

| | | |
|---|---|---|
| JP | 2004-510637 A | 4/2004 |
| JP | 2005094898 A | 4/2005 |
| JP | 2006001384 A | 1/2006 |
| JP | 2012-126224 A | 7/2012 |
| WO | 02/30730 A2 | 4/2002 |
| WO | 2012/025969 A1 | 3/2012 |

\* cited by examiner

INVERTED VEHICLE

CROSS-REFERENCE TO RELATED APPLICATIONS

This is a national phase application based on the PCT International Patent Application No. PCT/JP2013/005824 filed Sep. 30, 2013, claiming priority to Japanese Patent Application No. 2012-236326 filed Oct. 26, 2012, the entire contents of both of which are incorporated herein by reference.

TECHNICAL FIELD

The present invention relates to an inverted vehicle, and more particularly, to an inverted vehicle that detects a rider riding on the vehicle and performs an inverted control of the vehicle.

BACKGROUND ART

Patent Literature 1 discloses a rider detector for detecting the presence of a rider riding on a transporter. As shown in FIG. 16, this rider detector detects the presence of a rider by detecting an interruption of passage of a light beam 504 when the rider is riding on a base mat 501 and the base mat 501 and a base cover 503 located below the base mat are elastically deformed about a mat wall 502 of the base mat 501.

However, this rider detector has a large dead zone 510 in which the base mat 501 is not elastically deformed even when the rider is riding on the vehicle in the vicinity of the mat wall 502. That is, the rider detector has a problem that the accuracy of detecting the presence of a rider is low.

CITATION LIST

Patent Literature

Patent Literature 1: Published Japanese Translation of PCT International Publication for Patent Application No. 2004-510637

SUMMARY OF INVENTION

Technical Problem

The present invention has been made based on the above-mentioned findings, and an object of the present invention is to provide an inverted vehicle capable of improving the accuracy of detecting the presence of a rider.

Solution to Problem

An inverted vehicle according to a first aspect of the present invention is an inverted vehicle including: wheels; a base that holds the wheels so as to be able to drive the wheels; a step cover on which a rider rides, the step cover being connected to an upper portion of the base; an elastic element that is connected to the upper portion of the base and elastically supports the step cover; a detection portion that is provided between the base and the step cover and detects a pressing force applied from the step cover when the rider is riding on the inverted vehicle and the elastic element is elastically deformed to thereby depress the step cover; and a control portion that drives the wheels and performs an inverted control based on the detection of the pressing force by the detection portion. The step cover is connected to the base with a hinge.

Advantageous Effects of Invention

According to the above-mentioned aspect of the present invention, it is possible to provide an inverted vehicle capable of improving the accuracy of detecting the presence of a rider.

DESCRIPTION OF EMBODIMENTS

Preferred embodiments of the present invention will be described below with reference to the drawings. Specific numerical values and the like described in the following embodiments are given by way of example only to facilitate the understanding of the invention, and are not limited thereto, unless otherwise stated. For clarity of the explanation, matters which are obvious to those skilled in the art, or matters which have no direct relation to the embodiments of the present invention, for example, are omitted and simplified as appropriate in the following description and the drawings.

First Embodiment of the Invention

Figure 1:
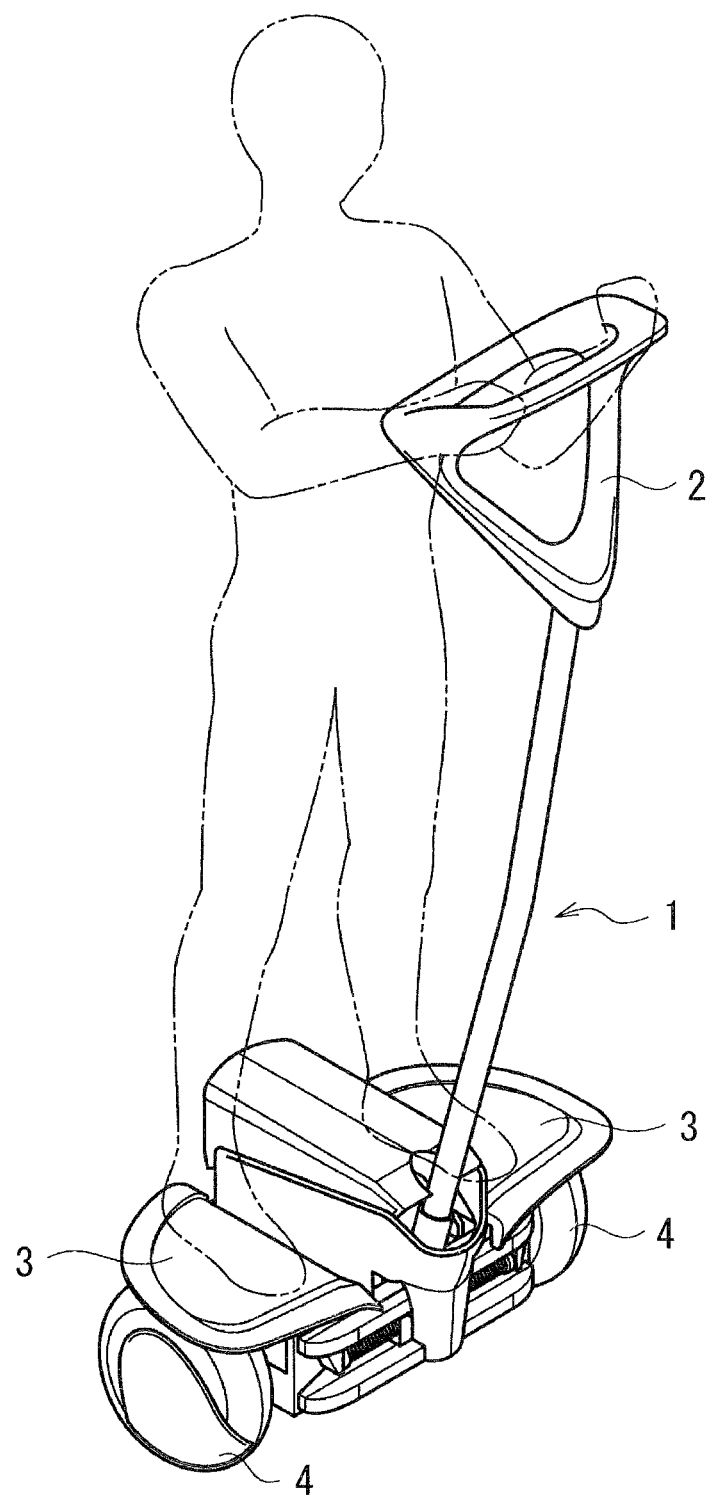
FIG. 1 is a view showing a schematic structure of an inverted two-wheel vehicle according to a first embodiment.

First, a first embodiment of the present invention will be described. Referring to FIG. 1, a schematic structure of an inverted two-wheel vehicle 1 according to the first embodiment will be described. FIG. 1 is a view showing the schematic structure of the inverted two-wheel vehicle 1 according to the first embodiment.

The inverted two-wheel vehicle 1 includes a handle 2, a pair of right and left step covers 3, and a pair of right and left wheels 2. A rider rides on the inverted two-wheel vehicle 1 in a state in which the rider grips the handle 2 with both hands and places his/her feet on the step covers 3. The inverted two-wheel vehicle 1 uses a sensor to detect a posture angle of the inverted two-wheel vehicle 1 in the front-back direction when the rider applies a load in the front-back direction of the inverted two-wheel vehicle 1. Based on the detection result, the inverted two-wheel vehicle 1 controls motors, which drive the right and left wheels 4, so as to maintain the inverted state of the inverted two-wheel vehicle 1. Specifically, the inverted two-wheel vehicle 1 controls the motors, which drive the right and left wheels 4, in the following manner. That is, when the rider riding on the step covers 3 applies a load forward to thereby incline the inverted two-wheel vehicle 1 forward, the inverted two-wheel vehicle 1 is accelerated forward so as to maintain the inverted state of the inverted two-wheel vehicle 1. When the rider applies a load backward to thereby incline the inverted two-wheel vehicle 1 backward, the inverted two-wheel vehicle 1 is accelerated backward so as to maintain the inverted state of the inverted two-wheel vehicle 1.

The inverted two-wheel vehicle 1 uses a sensor to detect a posture angle of the inverted two-wheel vehicle 1 in the right-left direction when the rider applies a load in the right-left direction of the inverted two-wheel vehicle 1. Based on the detection result, the inverted two-wheel vehicle 1 controls the motors, which drive the right and left wheels 4, so that the inverted two-wheel vehicle 1 performs a turning motion. Specifically, the inverted two-wheel vehicle 1 controls the motors, which drive the right and left wheels 4, in the following manner. That is, when the rider riding on the step covers 3 applies a load leftward to thereby incline the inverted two-wheel vehicle 1 leftward, the inverted two-wheel vehicle 1 is allowed to make a left hand turn. When the rider applies a load rightward to thereby incline the inverted two-wheel vehicle 1 rightward, the inverted two-wheel vehicle 1 is allowed to make a right hand turn.

Figure 2:
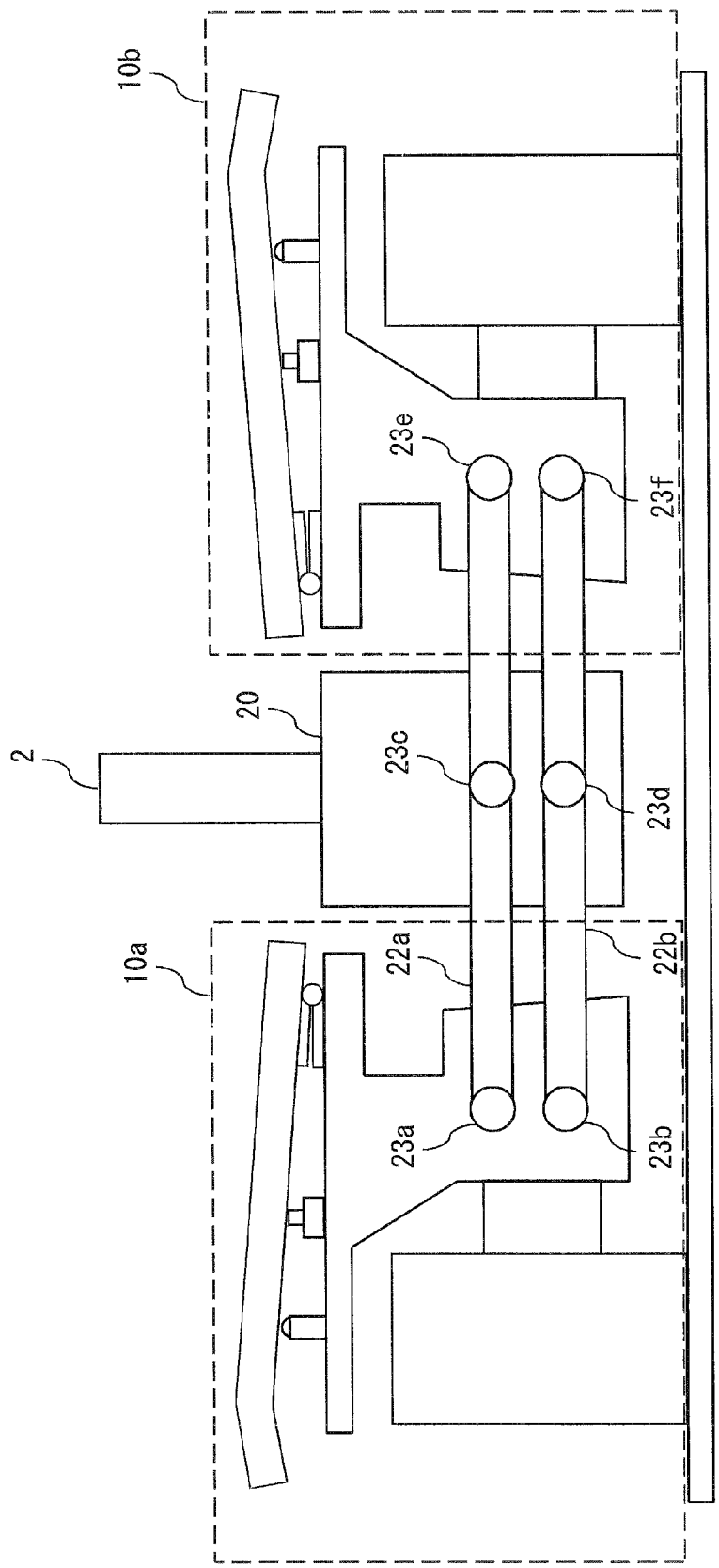
FIG. 2 is a front sectional view showing the structure of the inverted two-wheel vehicle according to the first embodiment.

Referring next to FIG. 2, the structure of the inverted two-wheel vehicle 1 according to the first embodiment will be described. FIG. 2 is a front sectional view showing the structure of the inverted two-wheel vehicle according to the first embodiment.

The inverted two-wheel vehicle 1 includes a pair of riding portions 10a and 10b and a control unit 20.

The riding portions 10a and 10b and the control unit 20 are connected to each other through links 22a and 22b which are arranged in parallel in the vertical direction. One end of the link 22a and one end of the link 22b are each connected to the riding portion 10a. The other end of the link 22a and the other end of the link 22b are each connected to the riding portion 10b. The midpoint of the link 22a and the midpoint of the link 22b are each connected to the control unit 20. The riding portions 10a and 10b are connected symmetrically with respect to the control unit 20. The handle 2 is connected to an upper portion of the control unit 20.

The link 22a is connected to the riding portion 10a through a link rotational joint portion 23a. The link 22a is rotatable about the roll axis of the inverted two-wheel vehicle 1 with the link rotational joint portion 23a as a center. The link 22b is connected to the riding portion 10a through a link rotational joint portion 23b. The link 22b is rotatable about the roll axis of the inverted two-wheel vehicle 1 with the link rotational joint portion 23b as a center.

Further, the link 22a is connected to the control unit 20 through a link rotational joint portion 23c. The link 22a is rotatable about the roll axis of the inverted two-wheel vehicle 1 with the link rotational joint portion 23c as a center. The link 22b is connected to the control unit 20 through a link rotational joint portion 23d. The link 22b is rotatable about the roll axis of the inverted two-wheel vehicle 1 with the link rotational joint portion 23d as a center.

Furthermore, the link 22a is connected to the riding portion 10b through a link rotational joint portion 23e. The link 22a is rotatable about the roll axis of the inverted two-wheel vehicle 1 with the link rotational joint portion 23e as a center. The link 22b is connected to the riding portion 10b through a link rotational joint portion 23f. The link 22b is rotatable about the roll axis of the inverted two-wheel vehicle 1 with the link rotational joint portion 23f as a center.

When the rider riding on the inverted two-wheel vehicle 1 applies a load rightward or leftward to change the posture angle of the inverted two-wheel vehicle 1 rightward or leftward, the riding portions 10a and 10b and the control unit 20 are inclined rightward or leftward at the same angle through the links 22a and 22b.

The control unit 20 drives motors (not shown) to cause the wheels 4, which are connected to the motors, to rotate. The control unit 20 includes a microcontroller (hereinafter also referred to as "micon") and a posture angle sensor which are not shown. Based on the posture angle of the inverted two-wheel vehicle 1, which is detected by the posture angle sensor, the micon controls the motors to maintain the inverted state of the inverted two-wheel vehicle 1.

Figure 3:
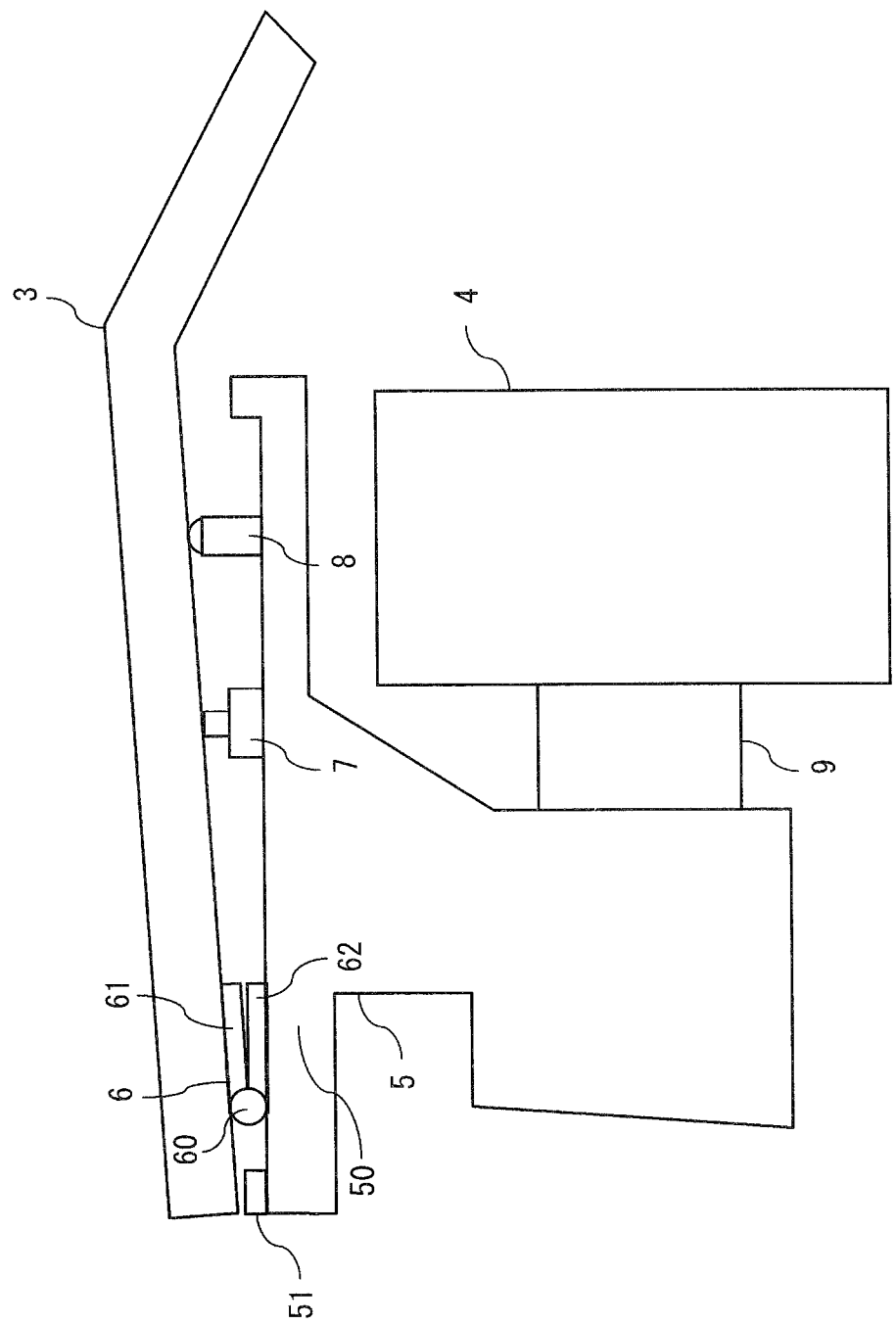
FIG. 3 is a front sectional view showing a structure of each riding portion according to the first embodiment.

Referring next to FIG. 3, the structure of each of the riding portions 10a and 10b according to the first embodiment will be described. FIG. 3 is a front sectional view showing the structure of each of the riding portions 10a and 10b according to the first embodiment.

The riding portions 10a and 10b each include the step cover 3, the wheel 4, a motor bracket 5, a hinge 6, a switch sensor 7, a plunger 8, and a driving portion 9.

The motor bracket 5 fixes the driving portion 9 and the wheel 4 toward a lateral side of the inverted two-wheel vehicle 1. The motor bracket 5 includes a base portion 50 which has a flat plate shape and is formed at an upper portion of the motor bracket 5. On the upper surface of the base portion 50, an opening prevention part 51, the hinge 6, the switch sensor 7, and the plunger 8 are attached in order from the center side of the inverted two-wheel vehicle 1 (i.e., the inside, control unit 20 side, handle 2 side, or shaft portion 60 side of the hinge 6) toward the lateral side thereof (i.e., the outside, or the opening/closing side of blade portions 61 and 62 of the hinge 6). The motor bracket 5 has such a shape that a part of the base portion 50 is located above the wheel 4. The above-mentioned links 22a and 22b are each connected to the motor bracket 5 of each of the riding portions 10a and 10b.

The step cover 3 has a size large enough to cover the base portion 50 so that the opening prevention part 51, the hinge 6, the switch sensor 7, and the plunger 8 are located between the step cover 3 and the base portion 50.

The hinge 6 connects the step cover 3 and the motor bracket 5 to each other so that the step cover 3 can be opened and closed about the central portion of the inverted two-wheel vehicle 1 with respect to the motor bracket 5. For example, the hinge 6 is provided at a position close to the central portion of the inverted two-wheel vehicle 1 by a predetermined distance relative to at least the center position in the right-left direction on the upper surface of the base portion 50.

Specifically, the hinge 6 includes the shaft portion 60, the first blade portion 61, and the second blade portion 62. One end of the first blade portion 61 and one end of the second blade portion 62 are connected to each other through the shaft portion 60. The first blade portion 61 and the second blade portion 62 are rotatable about the shaft portion 60. One side of the first blade portion 61 is connected to the lower surface of the step cover 3. One side of the second blade portion 62 is opposed to the other side (the side that is not connected to the step cover 3) of the first blade portion 61, and the other side of the second blade portion 62 is connected to the base portion 50. This structure allows the base cover 3, which is attached to the first blade portion 61, to rotate about the shaft portion 60 of the hinge 6 so as to be opened and closed with respect to the motor bracket 5 which is attached to the second blade portion 62.

The switch sensor 7 is a sensor that detects an external pressing force. The sensor 7 is pressed by the lower surface of the step cover 3 when the rider is riding on the step cover 3 and the step cover 3 is depressed. While the switch sensor 7 is pressed (depressed) by the step cover 3 in this manner, the switch sensor 7 outputs, to the micon of the control unit 20, a notification signal for notifying the micon about the pressing force through a signal line (not shown). The micon of the control unit 20 carries out the inverted control of the inverted two-wheel vehicle 1 during the period in which the micon is receiving the output of the notification signal from the switch sensor 7. Accordingly, the inverted two-wheel vehicle 1 travels while being subjected to the inverted control only during the period in which the rider is riding on the step covers 3. In other words, the switch sensor 7 functions as a sensor that detects the rider on the inverted two-wheel vehicle 1 as a pressing force applied from the step covers 3.

The micon of the control unit 20 may carry out the inverted control of the inverted two-wheel vehicle 1 when the micon is receiving the output of the notification signal from the switch sensor 7 of at least one of the riding portion 10a and the riding portion 10b. However, in order to prevent the inverted two-wheel vehicle 1 from starting to travel when the rider is in the process of getting on the vehicle, it is preferable to carry out the inverted control of the inverted two-wheel vehicle 1 when the micon is receiving the notification signals output from the switch sensors 7 of both the riding portion 10a and the riding portion 10b. This structure further enhances the safety of the rider when he/she is in the process of getting on the inverted two-wheel vehicle 1.

At least a part of the plunger 8 includes an elastic body. The step cover 3 is elastically supported by the elastic force of the elastic body. In this case, any elastic body, such as rubber or a spring, may be used as the elastic body of the plunger 8. The plunger 8 has a modulus of elasticity that allows the plunger 8 to be elastically deformed (compressed and deformed) when the rider steps on the step covers 3 and a load of a predetermined value or more is applied from the step covers 3. Any load that is assumed to be applied when the rider is on the vehicle can be determined to be the predetermined value. This prevents the switch sensor 7 from being depressed due to the weight of the step cover 3, and allows the plunger 8 to be elastically deformed when the rider is riding on the step cover 3, to thereby allow the switch sensor 7 to be depressed by the step cover 3.

This embodiment illustrates the case where the plunger 8 is disposed on a lateral side of the inverted two-wheel vehicle 1 relative to the switch sensor 7. Alternatively, the plunger 8 may be disposed on the center side of the inverted two-wheel vehicle 1 relative to the switch sensor 7. In other words, the plunger 8 may be disposed between the hinge 6 and the switch sensor 7. While this embodiment illustrates the case where the riding portions 10a and 10b are each provided with one plunger 8, the riding portions 10a and 10b may each be provided with a plurality of plungers 8.

The driving portion 9 causes the corresponding wheel 4 to rotate according to the control from the micon of the control unit 20. The driving portion 9 includes a motor and a reduction gear (not shown). The driving portion 9 causes the reduction gear to increase the torque of the motor to thereby rotate the corresponding wheel 4 according to the control from the micon of the control unit 20.

The step cover 3 and the base portion 50 each include an extending portion that extends toward the center side of the inverted two-wheel vehicle 1 relative to a connecting portion at which the step cover 3 and the base portion 50 are connected to the hinge 6. The opening prevention part 51 is attached to the upper surface of an extending portion of the base portion 50. The opening prevention part 51 is attached to, for example, the upper surface of an end of the base portion 50 on the center side of the inverted two-wheel vehicle 1. This prevents the step cover 3 from being opened wider than necessary due to contact with the opening prevention part 51 at the extending portion of the base portion 50. Accordingly, it is possible to suppress widening of an opening formed between the step cover 3 and the base portion 50, thereby improving the dust resistance for the space between the step cover 3 and the base portion 50. Consequently, for example, the elements 6 to 8, which are disposed between the step cover 3 and the base portion 50, can be prevented from being damaged, and the hindering of opening and closing of the step cover 3 due to foreign material caught between the first blade portion 61 and the second blade portion 62 of the hinge 6, or a false detection of riding of the rider on the vehicle due to foreign material caught between the switch cover 3 and the switch sensor 7 can be prevented.

In this case, the opening prevention part 51 may have any shape such as a rectangular parallelepiped, a cylinder, or a hemisphere. An arbitrary number of opening prevention parts 51 may be provided along an edge of the base portion 60 on the center side of the inverted two-wheel vehicle 1.

The step cover 3 and the base portion 50 may have a structure with no extending portion. In this case, the inverted two-wheel vehicle 1 does not include the opening prevention part 51 to be attached to the extending portion of the base portion 50. For example, when the step cover 3 includes an extending portion, the extending portion of the step cover 3 becomes a dead zone. On the other hand, when the step cover 3 includes no extending portion, the dead zone can be eliminated, resulting in an improvement in the accuracy of detecting the presence of the rider.

According to the structure described above, when the rider is riding on the step cover 3, the step cover 3 rotates about the center of the hinge 6 and causes the plunger 8 to be compressed and deformed, so that the step cover 3 is depressed relative to the switch sensor 7. The switch sensor 7 is depressed by the depressed step cover 3 and outputs the notification signal to the micon of the control unit 20. When the micon of the control unit 20 is receiving the output of the notification signal from the switch sensor 7, the micon carries out the inverted control of the inverted two-wheel vehicle 1. Thus, the inverted two-wheel vehicle 1 of the inverted two-wheel vehicle 1 is carried out only during the period in which the rider is riding on the inverted two-wheel vehicle 1.

In the first embodiment, each step cover 3 and the corresponding motor bracket 5 are connected to each other with the hinge 6. With this structure, the dead zone of each step cover 3 is limited to the portion immediately above the shaft portion 60 of the hinge 6. Therefore, according to the first embodiment, the dead zone in regard to detecting the presence of the rider can be reduced, thereby improving the accuracy of detecting the presence of the rider.

Second Embodiment of the Invention

Next, a second embodiment of the present invention will be described. The schematic structure and components of the inverted two-wheel vehicle 1 according to the second embodiment are similar to those of the inverted two-wheel vehicle 1 according to the first embodiment described above with reference to FIGS. 1 and 2, and thus the description thereof is omitted.

Figure 4:
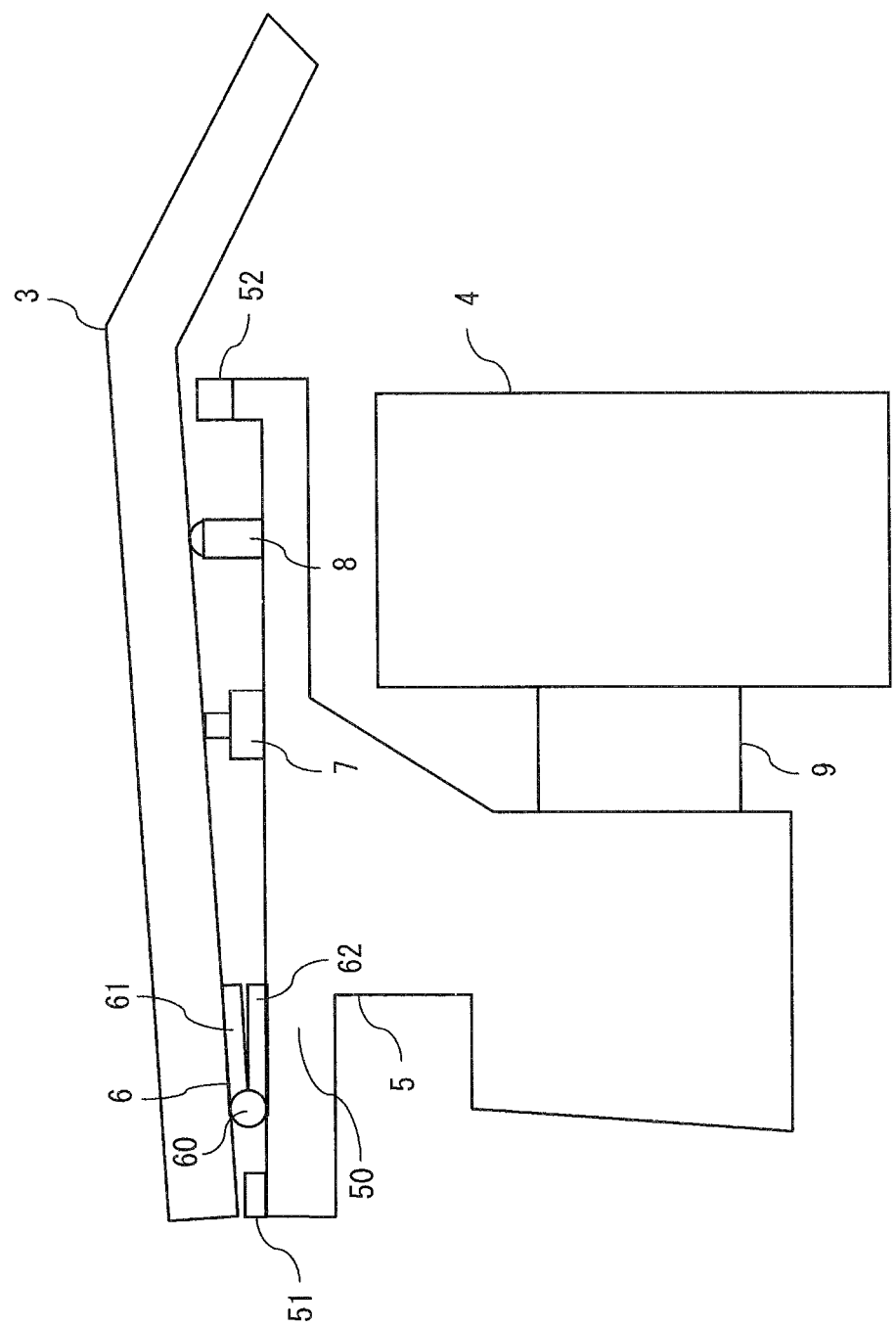
FIG. 4 is a front sectional view showing a structure of each riding portion according to a second embodiment.

Referring to FIG. 4, the structure of each of the riding portions 10a and 10b according to the second embodiment will be described. FIG. 4 is a front sectional view showing the structure of each of the riding portions 10a and 10b according to the second embodiment.

Each of the riding portions 10a and 10b according to the second embodiment further includes a dust-proof part 52, unlike the riding portions 10a and 10b according to the first embodiment.

The dust-proof part 52 is attached to the upper surface of the base portion 50 on a lateral side of the inverted two-wheel vehicle 1 relative to the hinge 6, the switch sensor 7, and the plunger 8. The dust-proof part 52 is attached to, for example, the upper surface of an end of the base portion 50 on a lateral side of the inverted two-wheel vehicle 1. The dust-proof part 52 may have any shape.

With this structure, the size of an opening leading from a lateral side of the inverted two-wheel vehicle 1 can be reduced with respect to the space between the step cover 3 and the base portion 50. In other words, the dust resistance for the space (inside of the inverted two-wheel vehicle 1) between the step cover 3 and the base portion 50 can be improved.

Figure 5:
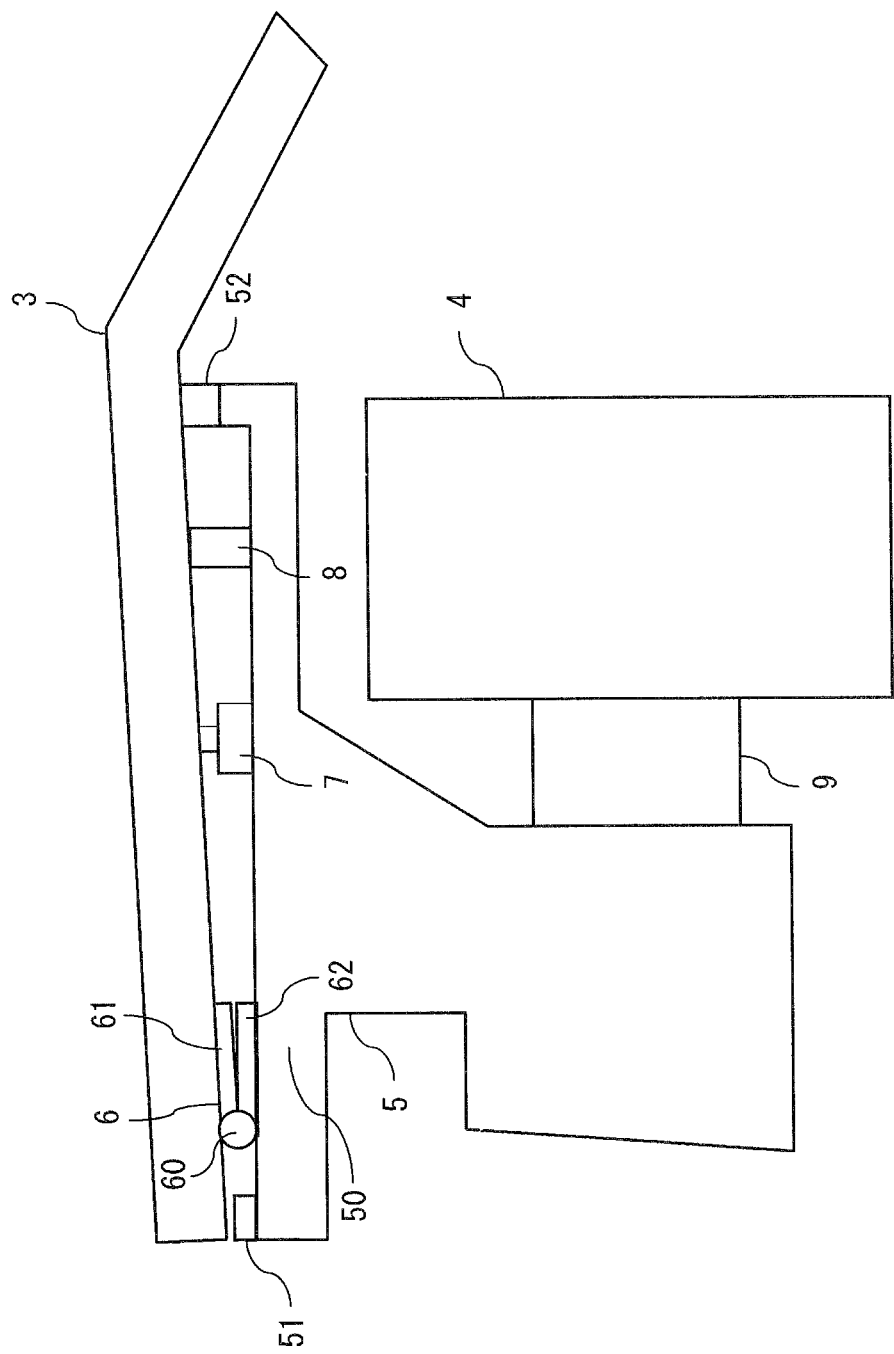
FIG. 5 is a front sectional view showing the structure of each riding portion according to the second embodiment.

As shown in FIG. 5, the dust-proof part 52 has such a height that the upper surface of the dust-proof part 52 and the lower surface of the step cover 3 are brought into close contact with each other when the rider is riding on the step cover 3 and thus the step cover 3 is depressed.

According to this structure, when the rider is riding on the step covers 3 and the inverted two-wheel vehicle 1 travels in accordance with the inverted control, the opening leading from a lateral side of the inverted two-wheel vehicle 1 to the space between the step cover 3 and the base portion 50 can be eliminated. Accordingly, dust or the like flung up due to the traveling of the inverted two-wheel vehicle 1 can be effectively prevented from flowing into the inverted two-wheel vehicle 1, and thus the dust resistance can be improved.

Figure 6:
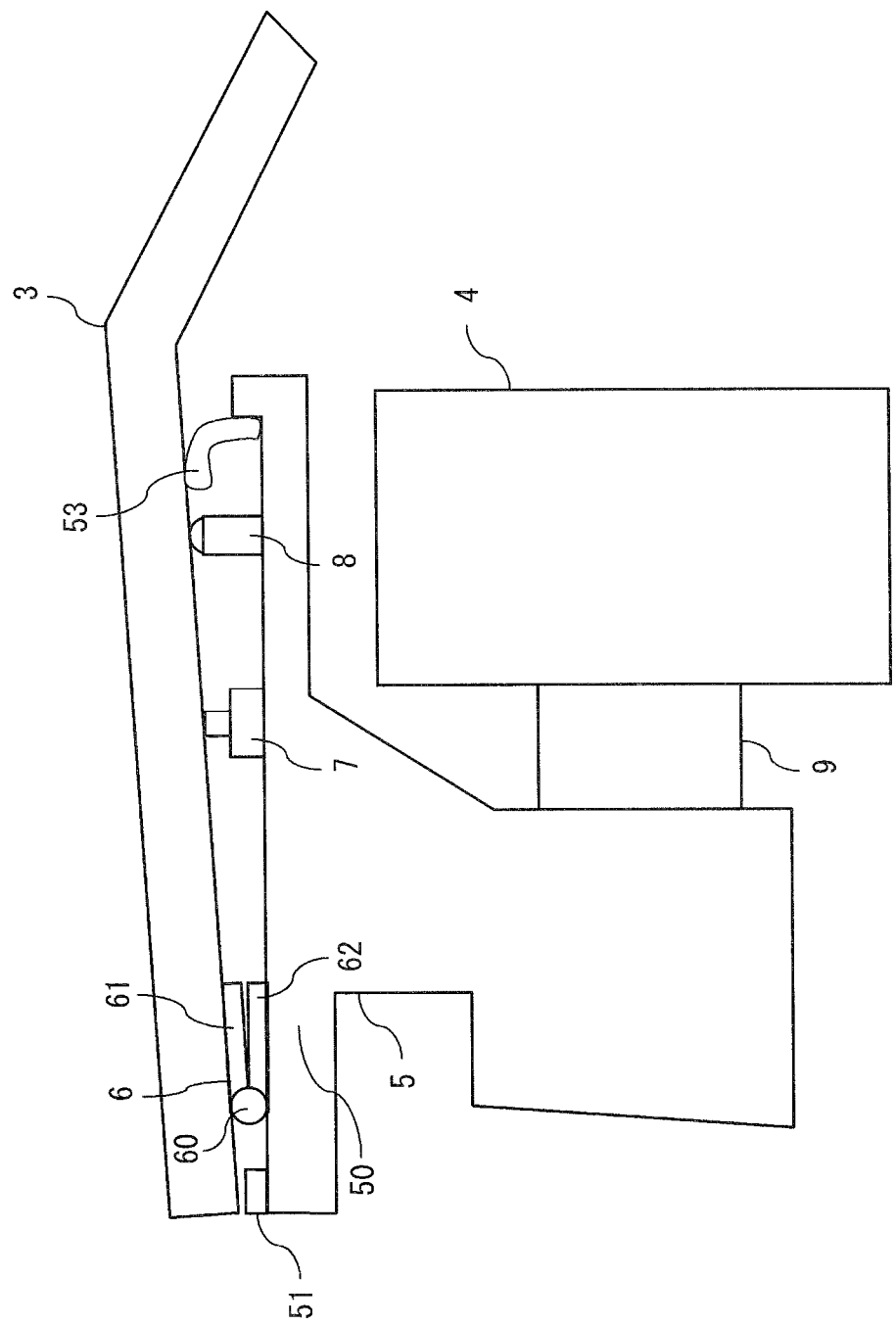
FIG. 6 is a front sectional view showing another structure of each riding portion according to the second embodiment.

A dust-proof part 53 shown in FIG. 6 may be provided instead of the dust-proof part 52. Unlike the dust-proof part 52, the dust-proof part 53 has such a height that the upper surface of the dust-proof part 53 and the lower surface of the step cover 3 are brought into close contact with each other even when the rider is not riding on the step cover 3 and the step cover 3 is not depressed.

According to this structure, even when the rider is not riding on each step cover 3 and the step cover 3 is not depressed, the opening leading from a lateral side of the inverted two-wheel vehicle 1 to the space between the step cover 3 and the base portion 50 can be eliminated, thereby further improving the dust resistance.

Figure 7:
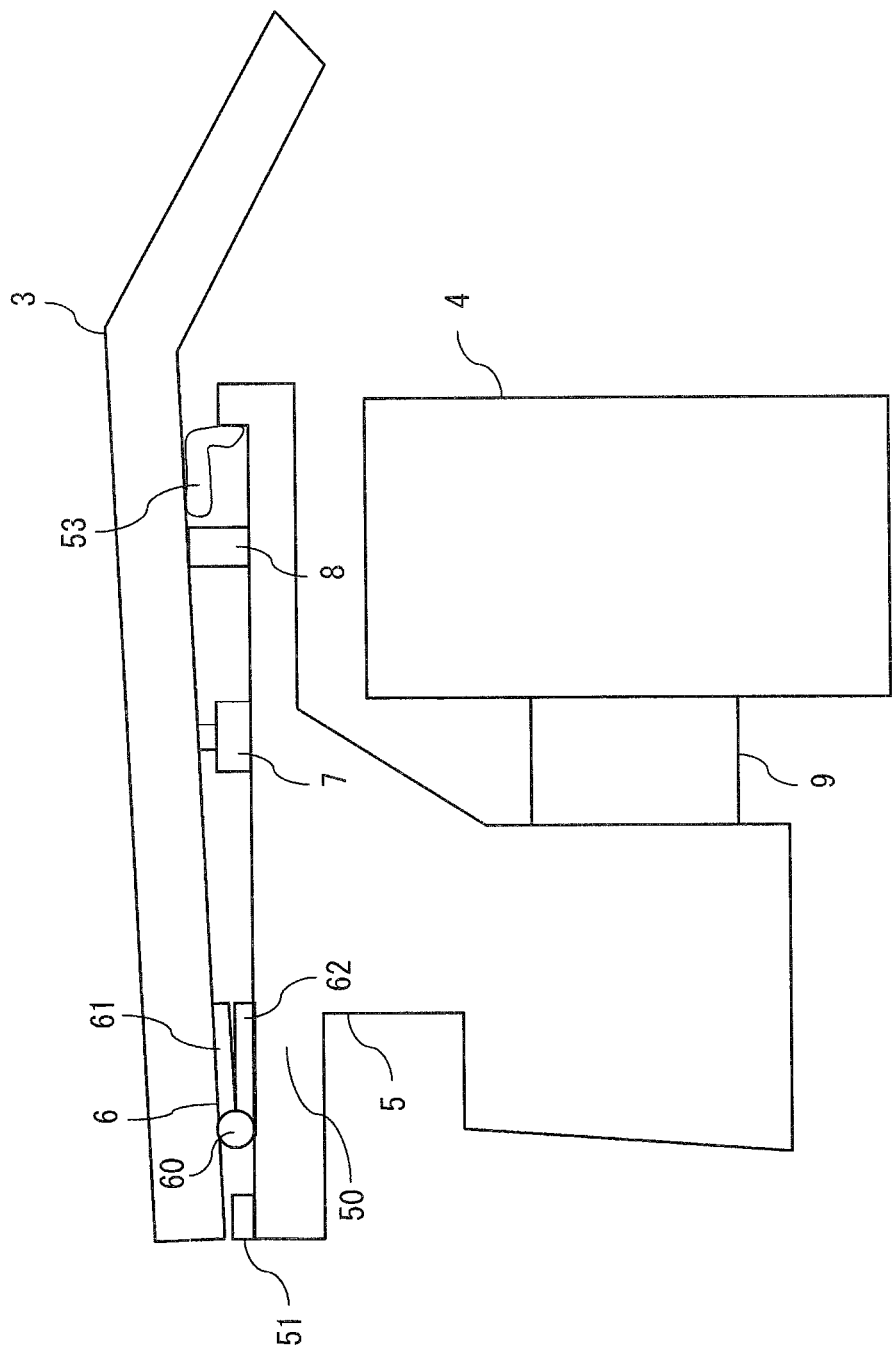
FIG. 7 is a front sectional view showing further another structure of each riding portion according to the second embodiment.

As shown in FIG. 7, at least a part of the dust-proof part 53 is formed of any elastic body so that the dust-proof part 53 is elastically deformed according to the pressing force applied from the lower surface of the step cover 3 when the rider is getting on the step cover 3 and thus the step cover 3 is depressed. As shown in FIG. 7, the dust-proof part 53 is elastically deformed so as to maintain the state in which the upper surface of the dust-proof part 53 and the lower surface of the step cover 3 are brought into close contact with each other even when the rider is riding on the step cover 3 and the step cover 3 is depressed.

According to this structure, dust or the like flung up due to traveling of the inverted two-wheel vehicle 1 can be prevented from flowing into the inverted two-wheel vehicle 1. In other words, the dust-proof part 53 shown in FIGS. 6 and 7 can secure the dust-proof function, regardless of whether or not the rider is riding on the step cover 3 and thus the step cover 3 is depressed.

As described above, in the second embodiment, the dust-proof part 52 or 53, which is attached to the upper surface of the motor bracket 5, is provided so as to be located between the motor bracket 5 and the step cover 3 on the opening/closing side of the blade portions 61 and 62 of the hinge 6 (on the lateral side of the inverted two-wheel vehicle 1). This improves the dust resistance for the space between the motor bracket 5 and the step cover 3.

Third Embodiment of the Invention

Next, a third embodiment will be described. The schematic structure and components of the inverted two-wheel vehicle 1 according to the third embodiment are similar to those of the inverted two-wheel vehicle 1 according to the first embodiment described above with reference to FIGS. 1 and 2, and thus the description thereof is omitted.

Figure 8:
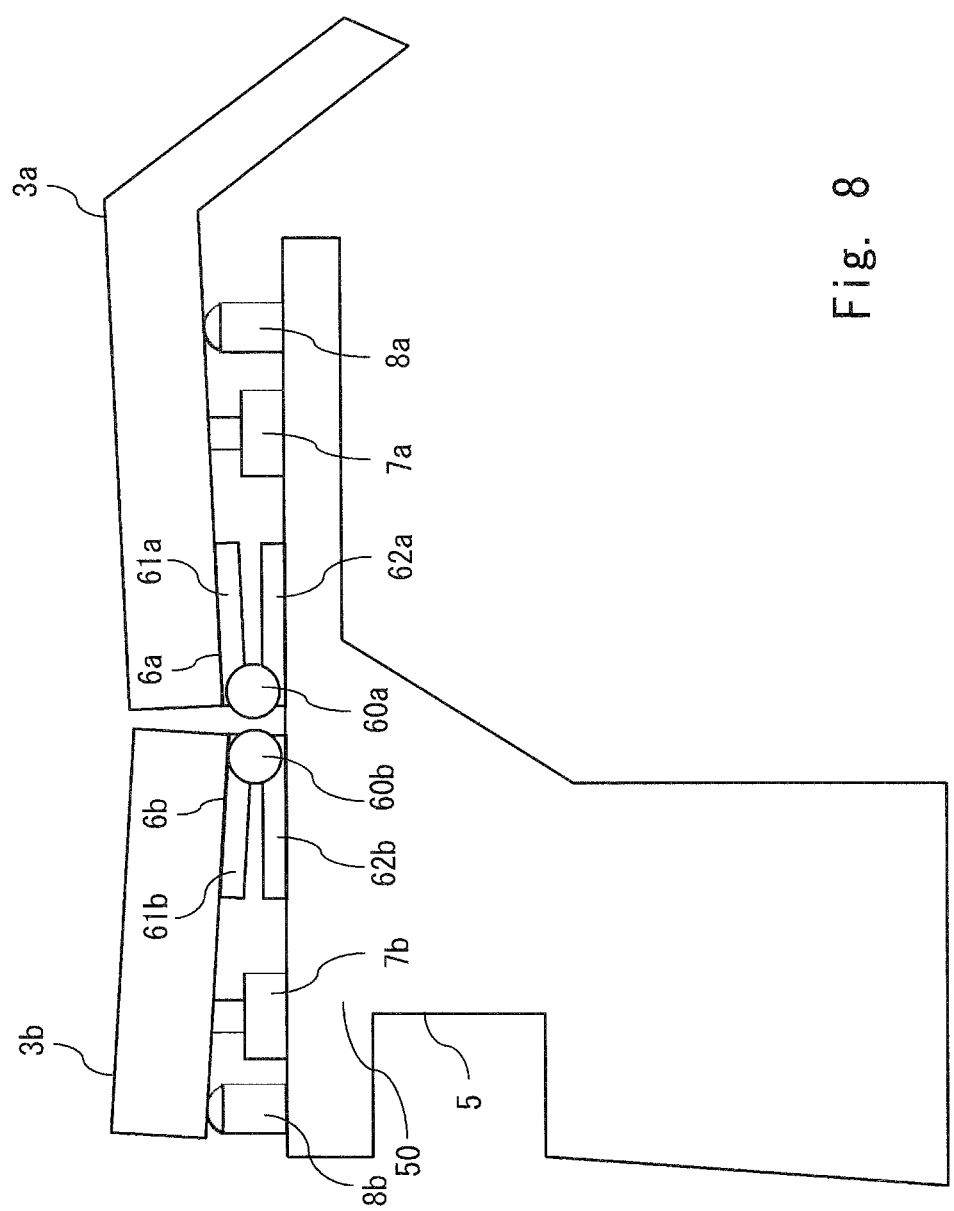
FIG. 8 is a front sectional view showing a structure of each riding portion according to a third embodiment.

Referring to FIG. 8, the structure of each of the riding portions 10a and 10b according to the third embodiment will be described. FIG. 8 is a diagram showing the structure of each of the riding portions 10a and 10b according to the third embodiment.

The riding portions 10a and 10b each include a pair of step covers 3, a pair of hinges 6, a pair of switch sensors 7, and a pair of plungers 8. In other words, the riding portions 10a and 10b each include two sets of step covers 3, hinges 6, switch sensors 7, and plungers 8. One of the pair of step covers 3, one of the pair of hinges 6, one of the pair of switch sensors 7, and one of the pair of plungers 8 are hereinafter referred to as a step cover 3a, a hinge 6a, a switch sensor 7a, and a plunger 8a, respectively. The other one of the pair of step covers 3, the other one of the pair of hinges 6, the other one of the pair of switch sensors 7, and the other one of the pair of plungers 8 are hereinafter referred to as a step cover 3b, a hinge 6b, a switch sensor 7b, and a plunger 8b, respectively.

The step cover 3a, the hinge 6a, the switch sensor 7a, and the plunger 8a are arranged symmetrically to the step cover 3b, the hinge 6b, the switch sensor 7b, and the plunger 8b so that the shaft portion 60 side of the hinge 6a and the shaft portion 60 side of the hinge 6b are opposed to each other on the upper surface of the base portion 50. In other words, the opening between the step cover 3a and the base portion 50

(the opening/closing side of the blade portions 61 and 62 of the hinge 6a) faces a lateral side of the inverted two-wheel vehicle 1, and the opening between the step cover 3b and the base portion 50 (the opening/closing side of the blade portions 61 and 62 of the hinge 6b) faces the center side of the inverted two-wheel vehicle 1.

According to this structure, for example, in the step cover 3a, the range of a dead zone on the center side of the inverted two-wheel vehicle 1 relative to the shaft portion 60 of the hinge 6a can be used as a sensitive zone in the step cover 3b. On the other hand, in the step cover 3b, the range of a dead zone on the center side of the inverted two-wheel vehicle 1 relative to the shaft portion 60 of the hinge 6a can be used as a sensitive zone in the step cover 3a. Consequently, the dead zone in the detection of the riding portion can be further reduced.

In the third embodiment, when the micon of the control unit 20 is receiving the notification signal output from at least one of the switch sensors 7a and 7b, the micon may carry out the inverted control of the inverted two-wheel vehicle 1. In order to prevent the inverted two-wheel vehicle 1 from starting to travel when the rider is in the process of getting on the vehicle, it is preferable to carry out the inverted control of the inverted two-wheel vehicle 1 when the micon is receiving an output of a communication signal from at least one of the switch sensors 7a and 7b of the riding portion 10a, as well as an output of a communication signal from at least one of the switch sensors 7a and 7b of the riding portion 10b.

Figure 9:
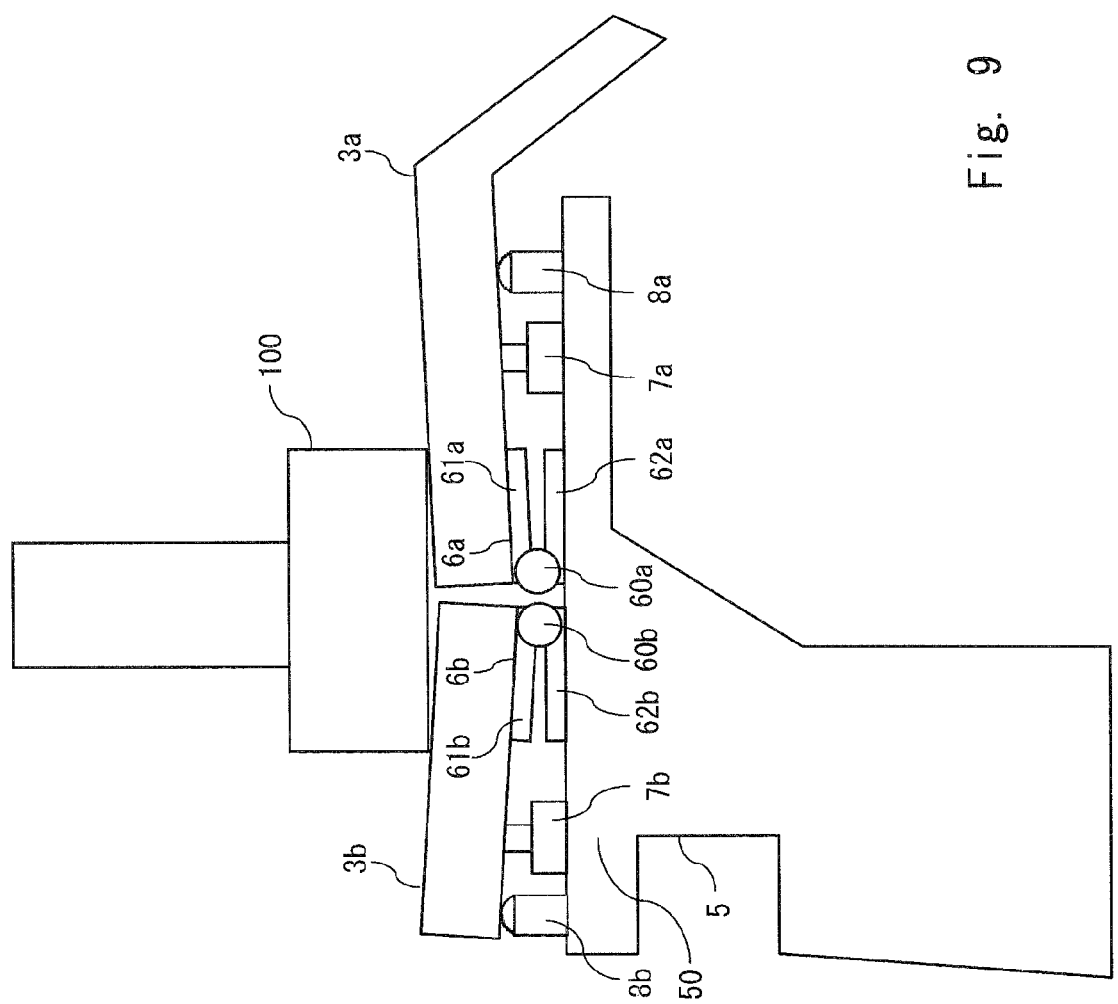
FIG. 9 is a diagram showing a state where a rider is riding on each riding portion according to the third embodiment.

As shown in FIG. 9, it is preferable that the distance between the hinge 6a and the hinge 6b be sufficiently smaller than the size of a foot 100 of the rider. This makes it possible to further reduce the dead zone between the hinge 6a and the hinge 6b. The distance between the hinge 6a and the hinge 6b may be arbitrarily determined. For example, the distance may be a few percent or a dozen percent of the average foot width, or may be a few centimeters.

As described above, in the third embodiment, the pair of step covers 3, the pair of switch sensors 7, and the like are provided, and the step covers 3a and 3b are each connected to the motor bracket 5 in such a manner that the shaft portion 60a side of the hinge 6a and the shaft portion 60b side of the hinge 6b are opposed to each other. According to this structure, the range of a dead zone in the step cover 3a on the shaft portion 60a side of the hinge 6a can be eliminated, that is, can be used as a sensitive zone in the step cover 3b. Further, the range of a dead zone in the step cover 3b on the shaft portion 60b side of the hinge 6b can be eliminated, that is, can be used as a sensitive zone in the step cover 3a. In other words, the dead zone in the detection of the presence of the rider can be reduced, and the accuracy of detecting the presence of the rider can be improved.

Fourth Embodiment of the Invention

Next, a fourth embodiment will be described. The schematic structure and components of the inverted two-wheel vehicle 1 according to the fourth embodiment are similar to those of the inverted two-wheel vehicle 1 according to the first embodiment described above with reference to FIGS. 1 and 2, and thus the description thereof is omitted.

Figure 10:
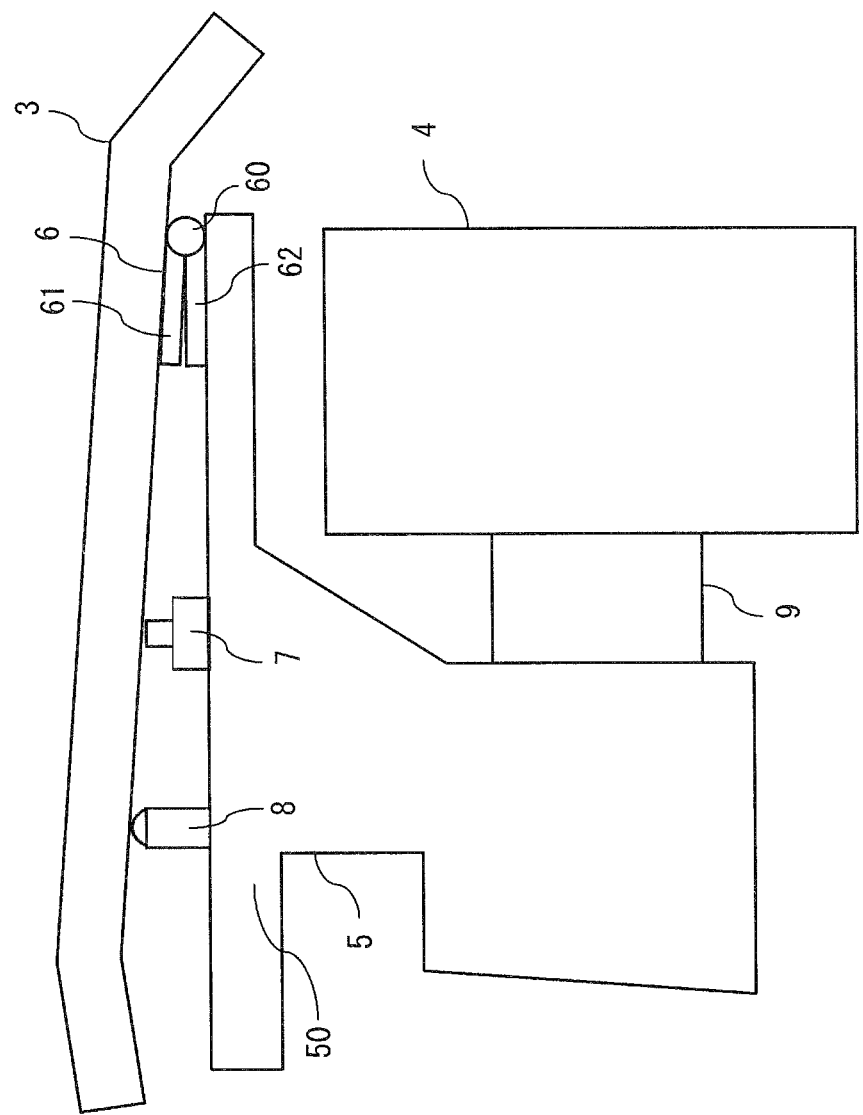
FIG. 10 is a front sectional view showing a structure of each riding portion according to a fourth embodiment.

Referring to FIG. 10, the structure of each of the riding portions 10a and 10b according to the fourth embodiment will be described. FIG. 10 is a diagram showing the structure of each of the riding portions 10a and 10b according to the fourth embodiment.

The sequence of installing of the hinge 6, the switch sensor 7, and the plunger 8 in each of the riding portions 10a and 10b according to the fourth embodiment is opposite to that in each of the riding portions 10a and 10b according to the first embodiment. Specifically, in the third embodiment, the plunger 8, the switch sensor 7, and the hinge 6 are mounted in order from the center side of the inverted two-wheel vehicle 1 toward the lateral side thereof on the upper surface of the base portion 50.

In this manner, the plunger 8, the switch sensor 7, and the hinge 6 may be arranged on the upper surface of the base portion 50 so that the dead zone immediately above the shaft portion 60 of the hinge 6 is located on the outside of the inverted two-wheel vehicle 1. In other words, in the fourth embodiment, the hinge 6 connects the step cover 3 and the motor bracket 5 to each other on the outside of the inverted two-wheel vehicle 1 so that the step cover 3 can be opened and closed about the outside of the inverted two-wheel vehicle 1 with respect to the motor bracket 5. For example, the hinge 6 is located at a position close to the outside of the inverted two-wheel vehicle 1 by a predetermined distance relative to at least the center position in the right-left direction on the upper surface of the base portion 50.

Figure 11:
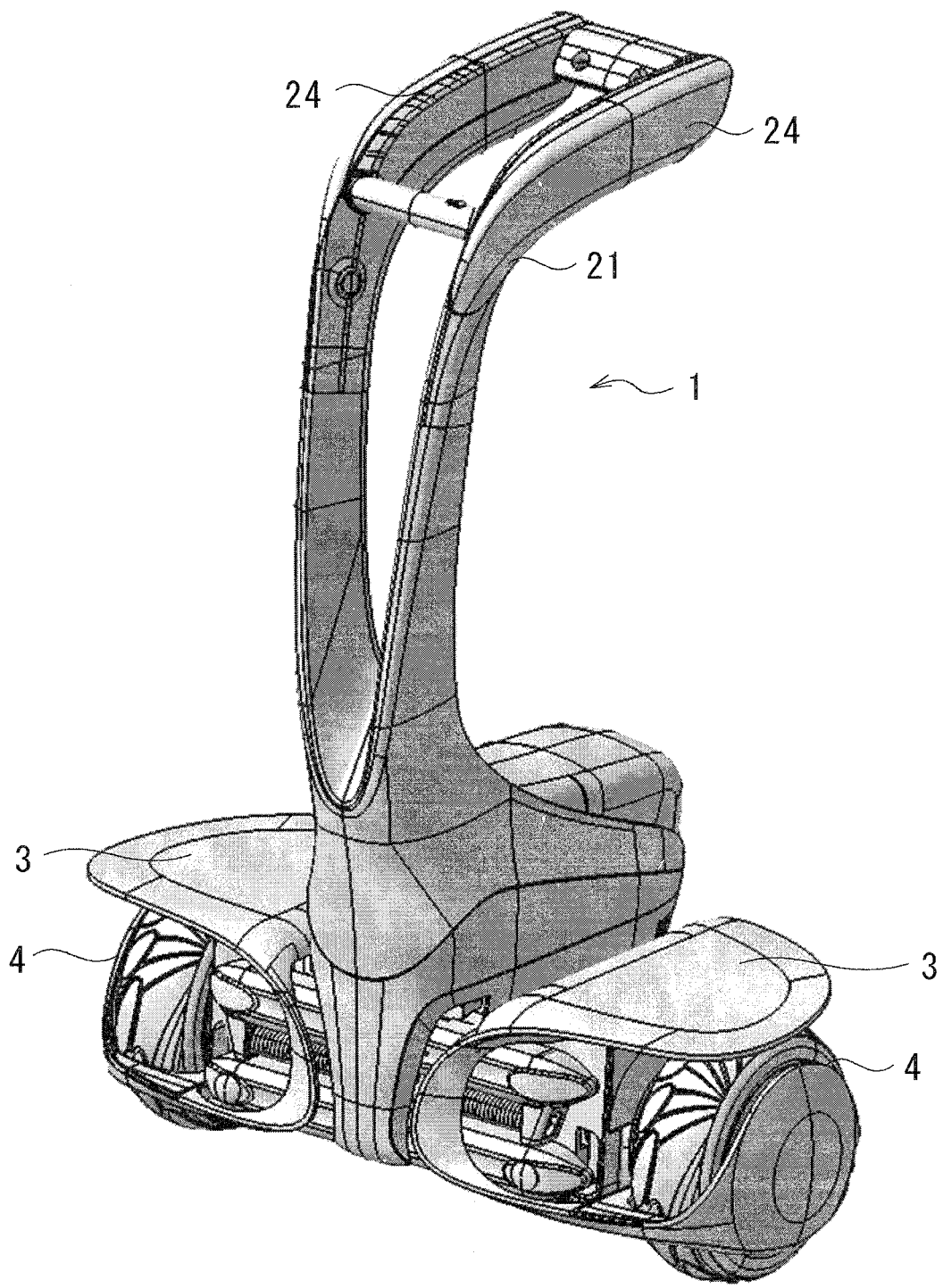
FIG. 11 is a view showing another schematic structure of an inverted two-wheel vehicle according to the fourth embodiment.

As shown in FIG. 11, the structure of each of the riding portions 10a and 10b according to the fourth embodiment is extremely effective in the structure in which a short-type handle 21 is used as the handle 2 of the inverted two-wheel vehicle 1. The handle 2 of the inverted two-wheel vehicle 1 shown in FIG. 1 is a long-type handle which is manipulated by the rider gripping the handle portion of the handle 2 with both hands. On the other hand, the handle 21 of the inverted two-wheel vehicle 1 shown in FIG. 11 is a short-type handle which is manipulated by the rider holding pad portions 24 of the handle 21 between his/her thighs.

When the inverted two-wheel vehicle 1 is provided with the short-type handle 21, the rider tends to ride on the center side of the inverted two-wheel vehicle 1 so that the rider can hold the handle 21 between his/her thighs. Accordingly, the dead zone is placed on the outside (tire side) as in the riding portions 10a and 10b according to the fourth embodiment, thereby increasing the possibility of the rider placing his/her feet in the sensitive zone. That is, all the embodiments can be applied to the inverted two-wheel vehicle 1 including the short-type handle 21 shown in FIG. 11. Especially, when the fourth embodiment is applied to the inverted two-wheel vehicle 1, the accuracy of detecting the presence of the rider can be improved.

Figure 12:
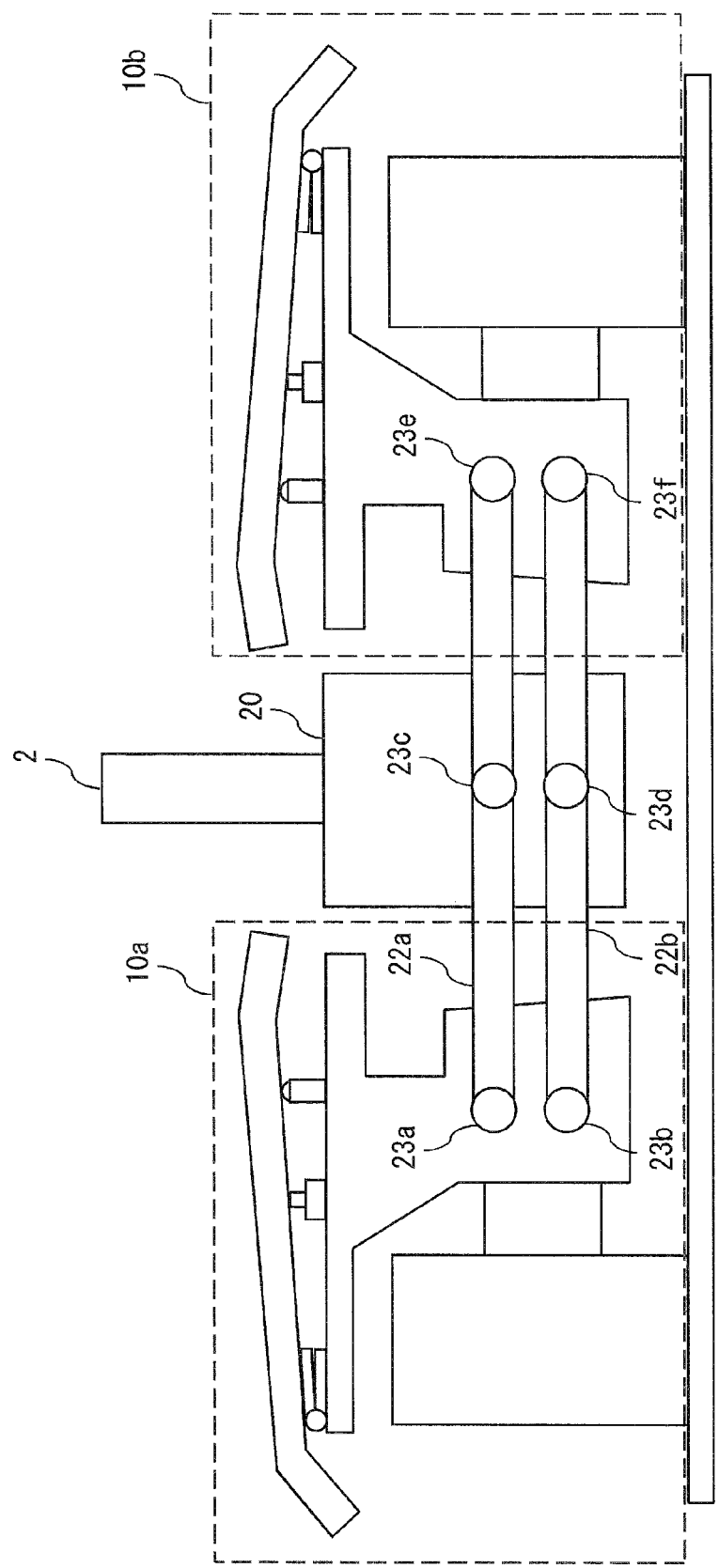
FIG. 12 is a front sectional view showing a state where the inverted two-wheel vehicle according to the fourth embodiment is in a non-turning state.
Figure 13:
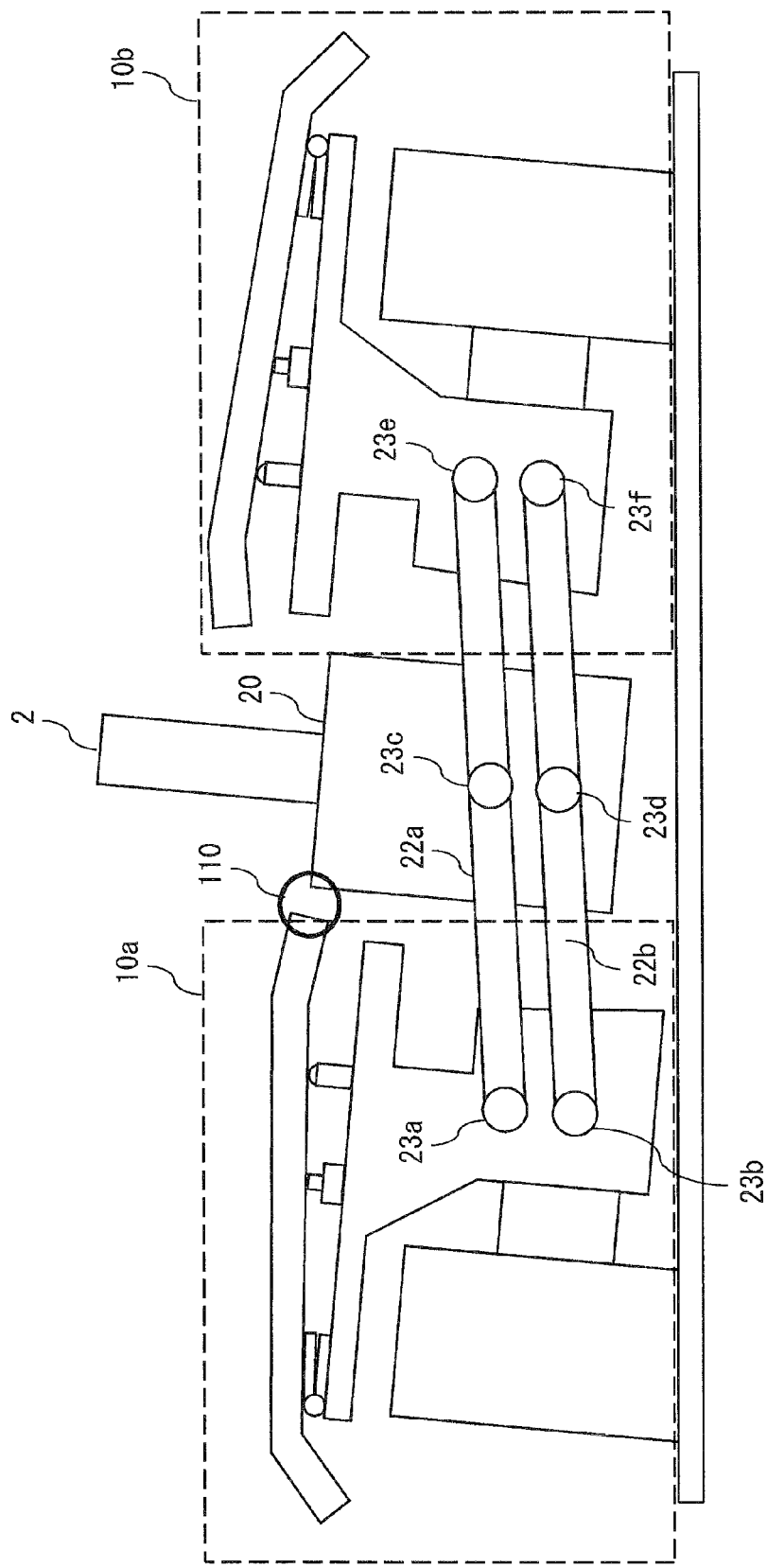
FIG. 13 is a front sectional view showing a state where the inverted two-wheel vehicle according to the fourth embodiment is in a turning state.

As shown in FIG. 12, in a turning motion in which the rider applies a load in the right-left direction to cause the posture angle of the inverted two-wheel vehicle 1 to be inclined in the right-left direction as shown in FIG. 13, a clearance 110 between the step cover 3 and the control unit 20 can be reduced, unlike in a non-turning motion in which the rider applies no load in the right-left direction and thus the posture angle of the inverted two-wheel vehicle 1 is not inclined in the right-left direction as shown in FIG. 12. Accordingly, the shape of each step cover 3 may be designed to prevent the portion of each cover 3 on the center side of the inverted two-wheel vehicle 1 from interfering with the control unit 20.

In the fourth embodiment, as described above, in the structure including the handle 21, which is held between the thighs of the rider, and the pair of riding portions 10a and 10b, each step cover 3 is connected to the corresponding motor bracket 5 in such a manner that the opening/closing side of the blade portions 61 and 62 of the hinge 6 faces the handle 21.

According to this structure, the sensitive zone of each step cover 3, which is located above the switch sensor 7 and the like, is located at a position close to the handle 21 where the rider can easily place his/her feet. Consequently, the possibility that the rider places his/her feet in the sensitive zone is increased, thereby improving the accuracy of detecting the presence of the rider.

Fifth Embodiment of the Invention

Next, a fifth embodiment will be described. The schematic structure and components of the inverted two-wheel vehicle 1 according to the fifth embodiment are similar to those of the inverted two-wheel vehicle 1 according to the first embodiment described above with reference to FIGS. 1 and 2, and thus the description thereof is omitted.

The first to fourth embodiments described above illustrate the case where the hinge 6 is disposed on the left side or the right side of each step cover 3 in such a manner that the opening/closing side of the blade portions 61 and 62 of the hinge 6 faces the left side or the right side of the inverted two-wheel vehicle 1. Alternatively, the hinge 6 may be disposed on the front side or the rear side of the corresponding step cover 3 in such a manner that the opening/closing side of the blade portions 61 and 62 of the hinge 6 faces the front side or the rear side of the inverted two-wheel vehicle 1.

Figure 14:
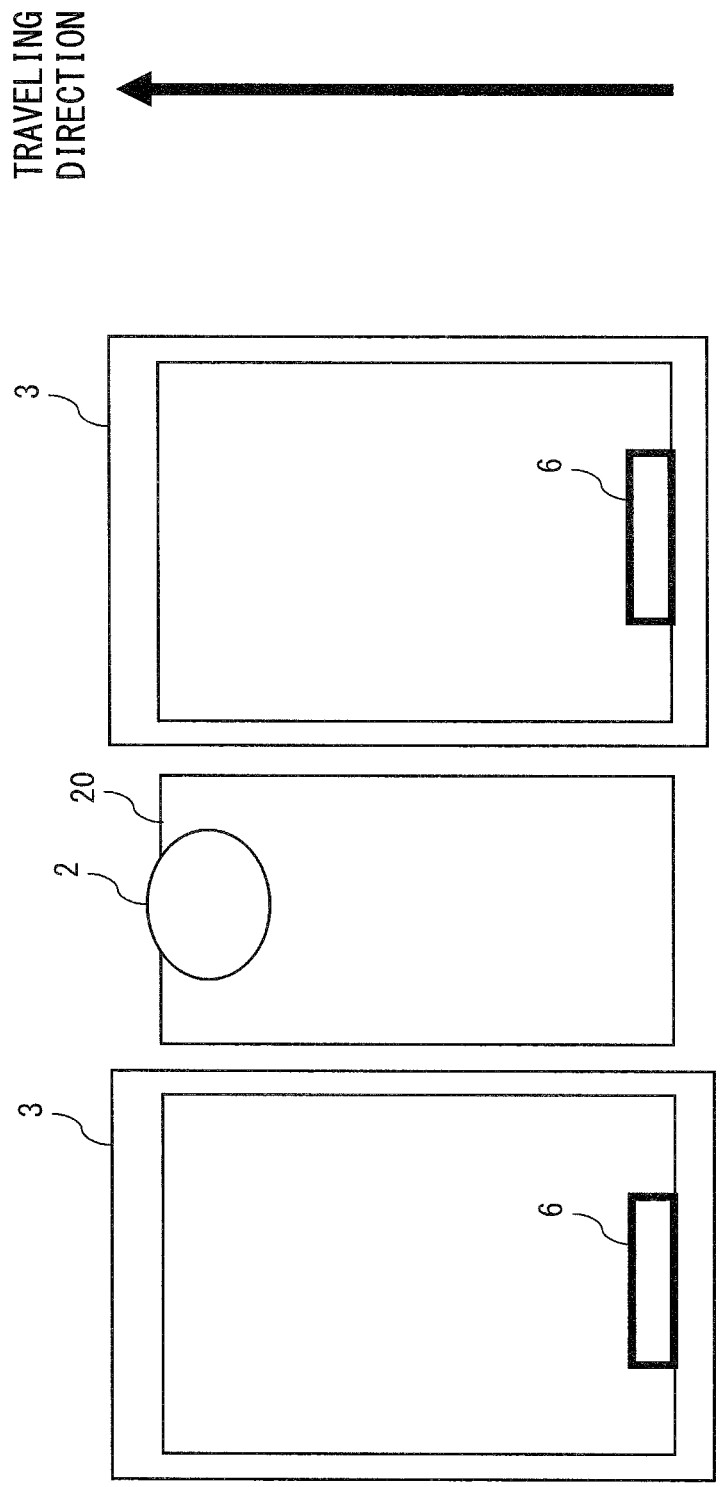
FIG. 14 is a top view showing a structure of an inverted two-wheel vehicle according to a fifth embodiment.
Figure 15:
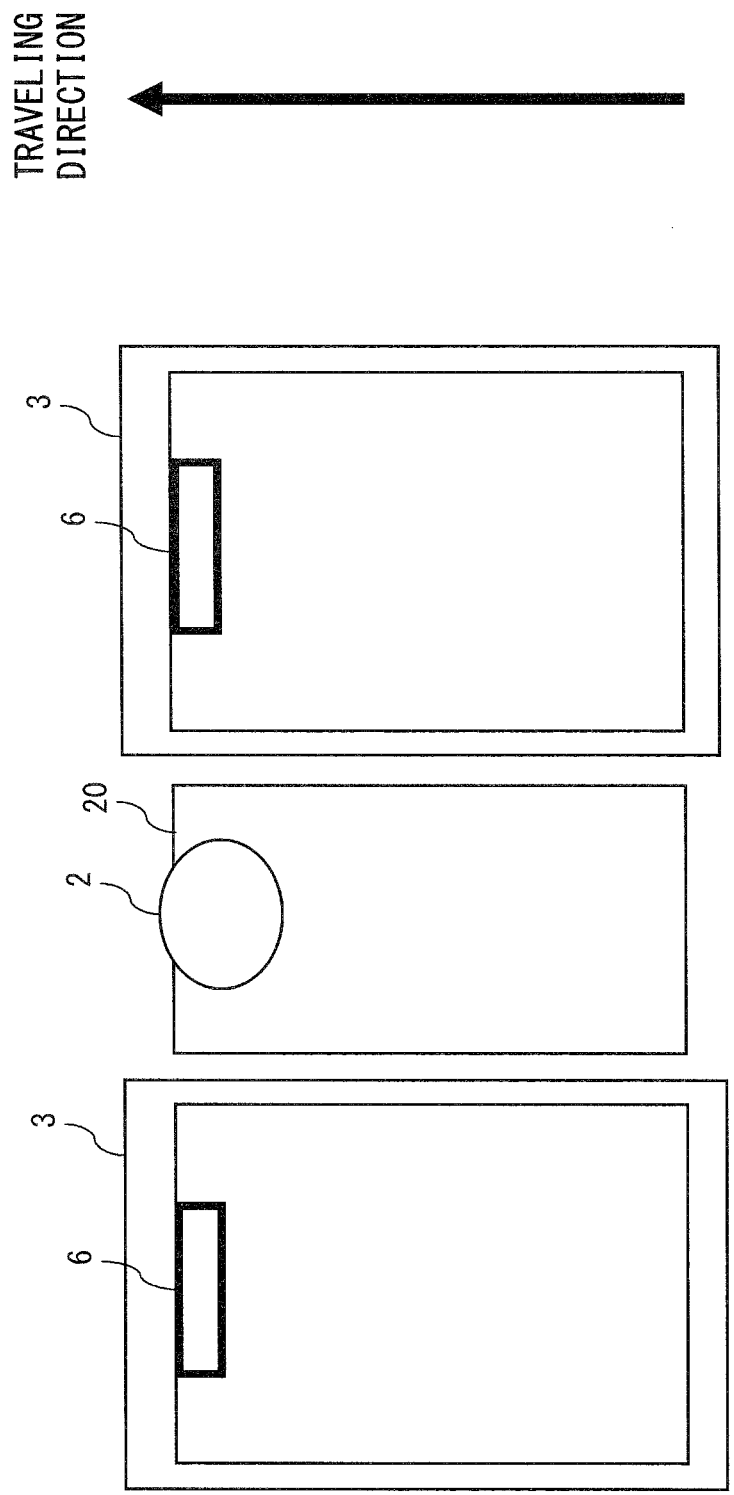
FIG. 15 is a top view showing the structure of the inverted two-wheel vehicle according to the fifth embodiment.
Figure 16:
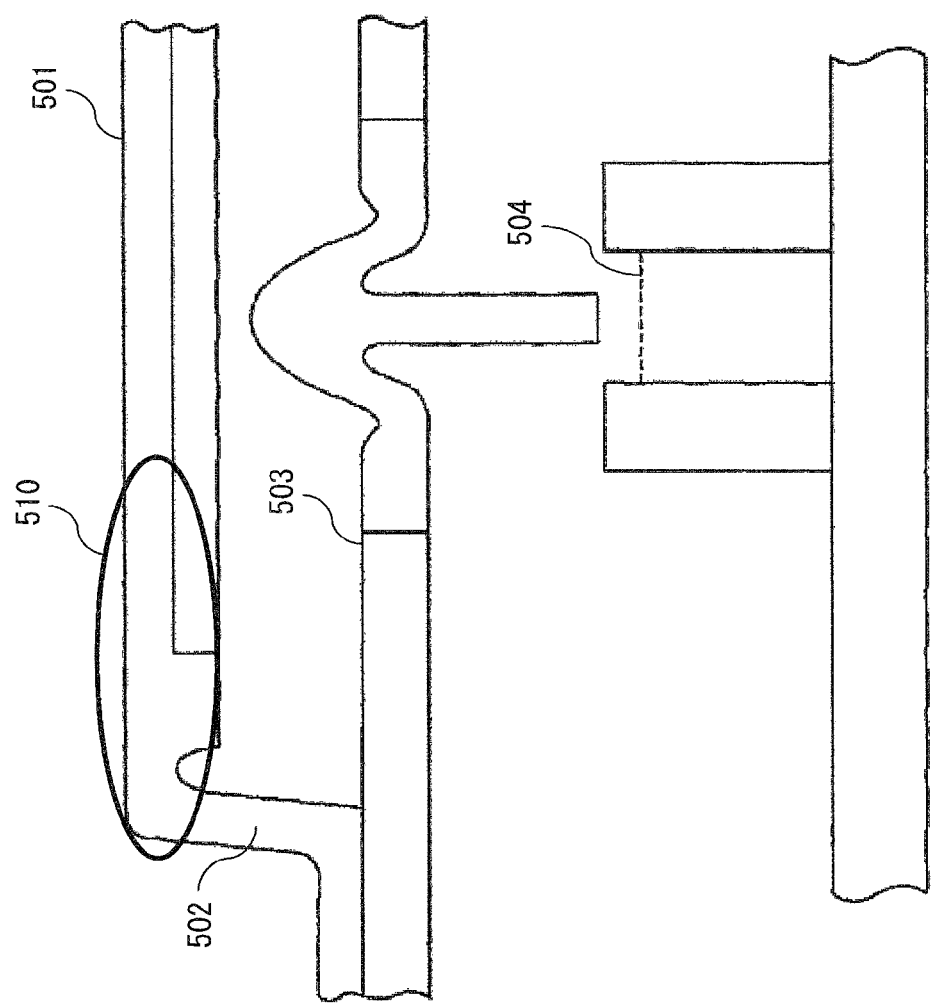
FIG. 16 is a diagram showing a rider detector disclosed in Patent Literature 1.

Referring to FIGS. 14 and 15, the structure of each of the riding portions 10a and 10b according to the fifth embodiment will be described. FIGS. 14 and 15 show the structure of each of the riding portions 10a and 10b according to the fifth embodiment.

As shown in FIG. 14, in an aspect of the fifth embodiment, the hinge 6 can be attached to the rear side of the base portion 50. Specifically, each step cover 3 is connected to the corresponding base portion 50 in such a manner that the opening/closing side of the blade portions 61 and 62 of the hinge 6 faces the front side of the inverted two-wheel vehicle 1. Accordingly, the hinge 6, the switch sensor 7, and the plunger 8 are mounted in order from the rear side to the front side of the inverted two-wheel vehicle 1 on the upper surface of the base portion 50. For example, the hinge 6 is provided at a position close to the rear side of the inverted two-wheel vehicle 1 by a predetermined distance relative to at least the center position in the front-back direction on the upper surface of the base portion 5. Alternatively, for example, the hinge 6 is provided at an end of the rear side on the upper surface of the base portion 50.

According to this structure, the sensitive zone of each step cover 3, which is located above the switch sensor 7 and the like, is located on the front side of the step cover 3. Accordingly, when the rider tends to place his/her feet on the front side of each step cover 3, the possibility that the rider places his/her feet in the sensitive zone is increased, thereby improving the accuracy of detecting the presence of the rider.

As shown in FIG. 15, in another aspect of the fifth embodiment, the hinge 6 can be attached to the front side of the base portion 50. Specifically, each step cover 3 is connected to the corresponding base portion 50 in such a manner that the opening/closing side of the blade portions 61 and 62 of the hinge 6 faces the rear side of the inverted two-wheel vehicle 1.

Accordingly, the hinge 6, the switch sensor 7, and the plunger 8 are mounted in order from the front side to the rear side of the inverted two-wheel vehicle 1 on the upper surface of the base portion 50. For example, the hinge 6 is provided at a position close to the front side of the inverted two-wheel vehicle 1 by a predetermined distance relative to at least the center position in the front-back direction on the upper surface of the base portion 50. Alternatively, for example, the hinge 6 is provided at an end of the front side on the upper surface of the base portion 50.

According to this structure, the sensitive zone of each step cover 3, which is located above the switch sensor 7 and the like, is located on the rear side of each step cover 3. Accordingly, when the rider tends to place his/her feet on the rear side of each step cover 3, the possibility that the rider will place his/her feet in the sensitive zone is increased, thereby improving the accuracy of detecting the presence of the rider.

As described above, in the fifth embodiment, each step cover 3 is connected to the corresponding motor bracket 5 in such a manner that the opening/closing side of the blade portions 61 and 62 of the hinge 6 faces the front side or the rear side of the inverted two-wheel vehicle 1. According to this structure, when the rider tends to place his/her feet on the front side or the rear side of each step cover 3, the possibility that the rider will place his/her feet in the sensitive zone is increased, thereby improving the accuracy of detecting the presence of the rider. In other words, a dead zone (or a sensitive zone) in each step cover 3 may be placed at a desired position depending on how the rider rides on the vehicle.

The present invention is not limited to the embodiments described above and can be modified as appropriate without departing from the scope of the present invention.

For example, the first to fifth embodiments can be implemented by arbitrarily combining two or more of them. For example, in the third to fifth embodiments, the dust-proof part 52 or 53 may be provided on the base portion 50, and in the third to fifth embodiments, the opening prevention part 51 may be provided on the base portion 50.

REFERENCE SIGNS LIST

1 INVERTED TWO-WHEEL VEHICLE
2 HANDLE
3 STEP COVER
4 WHEEL
5 MOTOR BRACKET
6 HINGE
7 SWITCH SENSOR
8 PLUNGER
9 DRIVING PORTION
10a, 10b RIDING PORTION
20 CONTROL UNIT
22a, 22b LINK
23a, 23b, 23c, 23d, 23e, 23f LINK ROTATIONAL JOINT PORTION
24 PAD PORTION
50 BASE PORTION
51 OPENING PREVENTION PART
52, 53 DUST-PROOF PART
60 SHAFT PORTION
61 FIRST BLADE PORTION
62 SECOND BLADE PORTION

The invention claimed is:
1. An inverted vehicle comprising:
a wheel;
a base that holds the wheel so as to be able to drive the wheel;
a step cover on which a rider rides, the step cover being connected to an upper portion of the base;

an elastic element that is connected to the upper portion of the base and elastically supports the step cover;

a detection portion that is provided between the base and the step cover and detects a pressing force applied from the step cover when the rider is riding on the inverted vehicle and the elastic element is elastically deformed to thereby depress the step cover;

a control portion that drives the wheel and performs an inverted control based on the detection of the pressing force by the detection portion;

wherein the step cover is connected to the base with a hinge, and a dust-proof portion attached to the upper surface of the base in such a manner that the dust-proof portion is located between the base and the step cover on an opening/closing side of blade portions of the hinge, wherein at least a part of the dust-proof portion is formed of an elastic body so that when the step cover is not depressed, an upper surface of the dust-proof portion contacts a lower surface of the step cover, and when the step cover is depressed, the dust-proof portion is elastically deformed while maintaining the contact with the lower surface of the step cover.

2. The inverted vehicle according to claim 1, wherein the inverted vehicle comprises a pair of the step covers with respective hinges, a pair of the elastic elements, and a pair of the detection portions, and the step covers are each connected to the base in such a manner that a shaft portion side of one hinge is opposed to a shaft portion side of the other hinge.

3. The inverted vehicle according to claim 1, wherein the hinge is provided on a circumference of the base.

4. An inverted vehicle comprising:

a wheel;

a base that holds the wheel so as to be able to drive the wheel;

a step cover on which a rider rides, the step cover being connected to an upper portion of the base;

an elastic element that is connected to the upper portion of the base and elastically supports the step cover;

a detection portion that is provided between the base and the step cover and detects a pressing force applied from the step cover when the rider is riding on the inverted vehicle and the elastic element is elastically deformed to thereby depress the step cover; and a control portion that drives the wheel and performs an inverted control based on the detection of the pressing force by the detection portion, wherein the step cover is connected to the base with a hinge, and the step cover is connected to the base in such a manner that an opening/closing side of blade portions of the hinge faces a front side or a rear side of the inverted vehicle.

5. The inverted vehicle according to claim 4, wherein the inverted vehicle comprises a pair of the step covers with respective hinges, a pair of the elastic elements, and a pair of the detection portions, and the step covers are each connected to the base in such a manner that a shaft portion side of one hinge is opposed to a shaft portion side of the other hinge.

6. An inverted vehicle comprising:

a wheel;

a base that holds the wheel so as to be able to drive the wheel;

a step cover on which a rider rides, the step cover being connected to an upper portion of the base;

an elastic element that is connected to the upper portion of the base and elastically supports the step cover;

a detection portion that is provided between the base and the step cover and detects a pressing force applied from the step cover when the rider is riding on the inverted vehicle and the elastic element is elastically deformed to thereby depress the step cover; and a control portion that drives the wheel and performs an inverted control based on the detection of the pressing force by the detection portion, wherein the step cover is connected to the base with a hinge, the step cover and the base each include an extending portion that extends to a shaft portion side of the hinge relative to a connecting portion at which the step cover and the base are connected to the hinge, and the base includes an opening prevention portion that is formed on an upper surface of the extending portion, the extending portion of the step cover being brought into contact with the opening prevention portion when the step cover is opened about the hinge with respect to the base.

7. The inverted vehicle according to claim 6, wherein the inverted vehicle comprises a pair of the step covers with respective hinges, a pair of the elastic elements, and a pair of the detection portions, and the step covers are each connected to the base in such a manner that a shaft portion side of one hinge is opposed to a shaft portion side of the other hinge.

* * * * *